July 18, 1944.  G. HÖNGER  2,354,020

CLOCKWORK ESCAPEMENT

Filed June 25, 1942

Inventor:
Guido Hönger
Young, Emery + Thompson
Attorneys

Patented July 18, 1944

2,354,020

UNITED STATES PATENT OFFICE 2,354,020

CLOCKWORK ESCAPEMENT

Guido Hönger, Geneva, Switzerland, assignor to Mefina S. A., Binningen, Switzerland, a corporation of Switzerland Application June 25, 1942, Serial No. 448,467
In Switzerland July 26, 1941

3 Claims. (Cl. 58—117)

This invention relates to clockwork escapements and has for its primary object to provide an escapement adapted to work for a relatively short time and in which wear is not an important factor, but in which high accuracy is required. Escapement mechanisms of this kind are useful in time check devices for telephone conversations, stop-watches, time fuzes for shells, time check devices for photographic copying and recording apparatus and similar mechanisms. For these puroposes simplicity of structure and low manufacturing cost are to be considered as important.

An escapement for use in the above mentioned devices therefore should have a minimum number of components capable of being manufactured in large quantities.

The invention consists in providing an escapement mechanism for clockwork comprising a pair of similar intermeshing gears rotatable about parallel axes one of said gears being driven by the clockwork, and a pallet oscillatable about an axis parallel to the axes of said gears and having is periphery intersecting symmetrically the circumferential arcs of travel of the ends of the teeth of said gears said pallet having an indentation in its periphery through which the ends of the teeth of both gears can pass. The escapement gears may be driven by a spring or a weight of the clockwork, or by centrifugal force in the case of an escapement for rotating shells.

It is a feature of the invention that the same teeth of the escapement wheels which co-act with each other in the meshing of the wheels also co-operate with the pallet.

Figure 1:
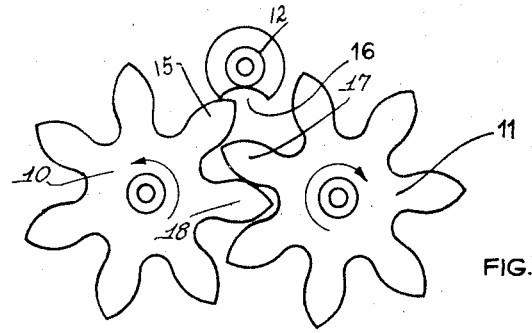
Figure 1 is a diagrammatic elevational view of the escapement alone with the parts in position of rest.
Figure 2:
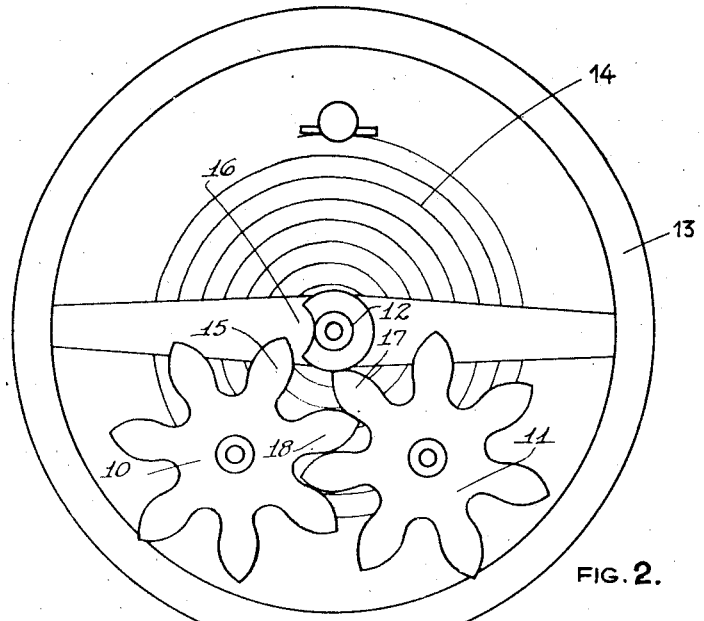
Fig. 2 is a similar view including a balance wheel device for operating the pallet.

The reference numerals 10 and 11 designate a pair of similar escapement gears of which, for an example, the gear 10 is rotated by clockwork or other driving means, and 12 is a pallet, located at the same distance from the center of each gear, which pallet is fixedly connected either with a pendulum (not shown) or with a balance wheel 13 (Fig. 2). In the latter case 14 is a spiral hair spring which oscillates the balance wheel. This spring especially in clockwork for time fuzes may be made in the form of a steel torque ribbon or wire. Fig. 1 shows the pallet at rest when no power is operating on the escapement gears.

Figure 3:
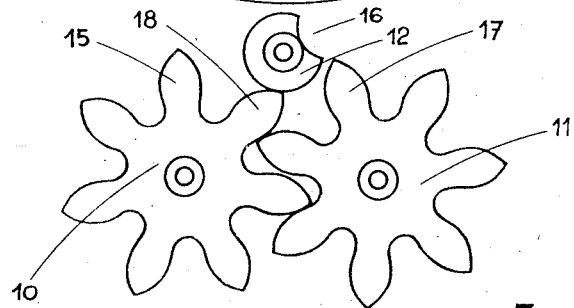
Fig. 3 is a view similar to Fig. 1 with the pallet in a different operational position.

When the escapement gear 10 is driven in the direction of the arrow (Fig. 1), its tooth 15 thrusts against the pallet and turns it until indentation 16 faces towards the left (Fig. 2). In this position the non-indented part of the pallet prevents the passing of the tooth 17 of the second escapement gear 11. The pallet then oscillates backwards, that is, anti-clockwise in Fig. 2 whereupon the indentation 16 allows the tooth 17 to pass, in doing which this latter thrusts the pallet towards the right into the position of Fig. 3, so that the following tooth 18 of the escapement gear 10 is locked by the non-indented part of the pallet. When the pallet oscillates again, this sequence of effects is repeated and so on.

Thus at each simple oscillation of the pallet, each escapement gear rotates by one half tooth gap in the direction of the arrow. The frequency of this intermittent turning motion depends only on the oscillation time of the pallet, that is, of the pendulum or of the balance wheel.

It is to be noted that this escapement device works symmetrically.

A special advantage of this escapement when used for time fuzes or rotating shells is that the centrifugal force operates only as an axial stress on both escapement gears, so that consequently, the duration of oscillation of the balance wheel is not influenced by it.

The embodying of such an escapement clockwork in a mechanical time fuze is preferably such that the balance wheel axis lies in the axis of the time fuze and the spiral hair spring is substituted by a torque spring located in the time fuze axis.

I claim:

1. An escapement mechanism for clockwork comprising a pair of similar intermeshing gears rotatable about parallel axes one of said gears being driven by the clockwork, and a pallet oscillatable about an axis parallel to the axes of said gears and having its periphery intersecting symmetrically the circumferential arcs of travel of the ends of the teeth of said gears said pallet having an indentation in its periphery through which the ends of the teeth of both gears can pass.

2. An escapement mechanism for clockwork comprising a pair of similar intermeshing gears rotatable about parallel axes one of said gears being driven by the clockwork, and a cylindrical pallet oscillatable about an axis parallel to the axes of said gears and having its periphery intersecting symmetrically the circumferential arcs of travel of the ends of the teeth of said gears said pallet having a cylindrical indentation in its periphery through which the ends of the teeth of both gears can pass.

3. An escapement mechanism for clockwork comprising a pair of similar intermeshing gears rotatable about parallel axes one of said gears being driven by the clockwork, and a cylindrical pallet oscillatable about an axis parallel to the axes of said gears and having its periphery intersecting symmetrically the circumferential arcs of travel of the ends of the teeth of said gears said pallet having a cylindrical indentation in its periphery through which the ends of the teeth of both gears can pass, the curvature of said cylindrical indentation being the same as that of the path of the ends of the gear teeth.

GUIDO HÖNGER.